W. M. FULTON.
PRESSURE REDUCING AND REGULATING VALVE.
APPLICATION FILED SEPT. 14, 1914.
1,184,940.
Patented May 30, 1916.
2 SHEETS—SHEET 2.
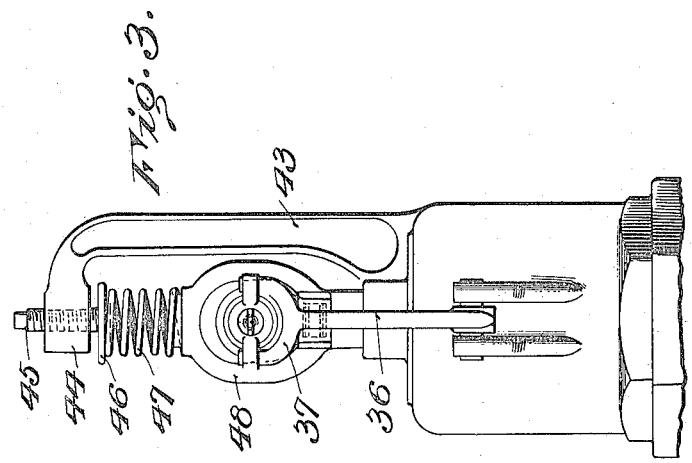
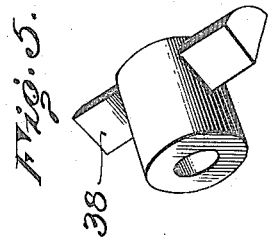
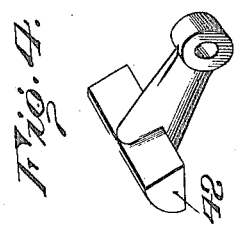
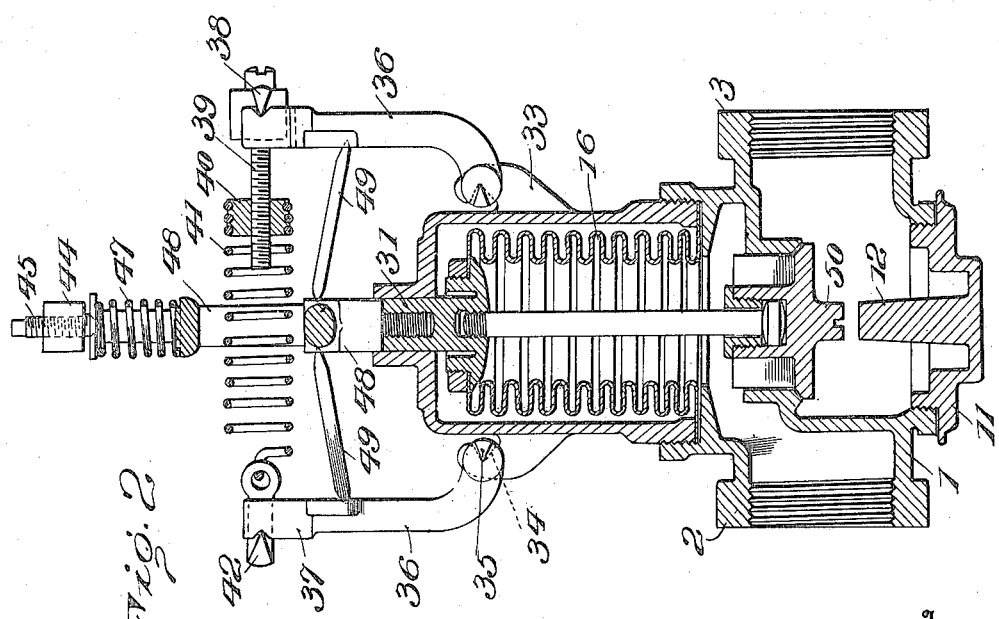

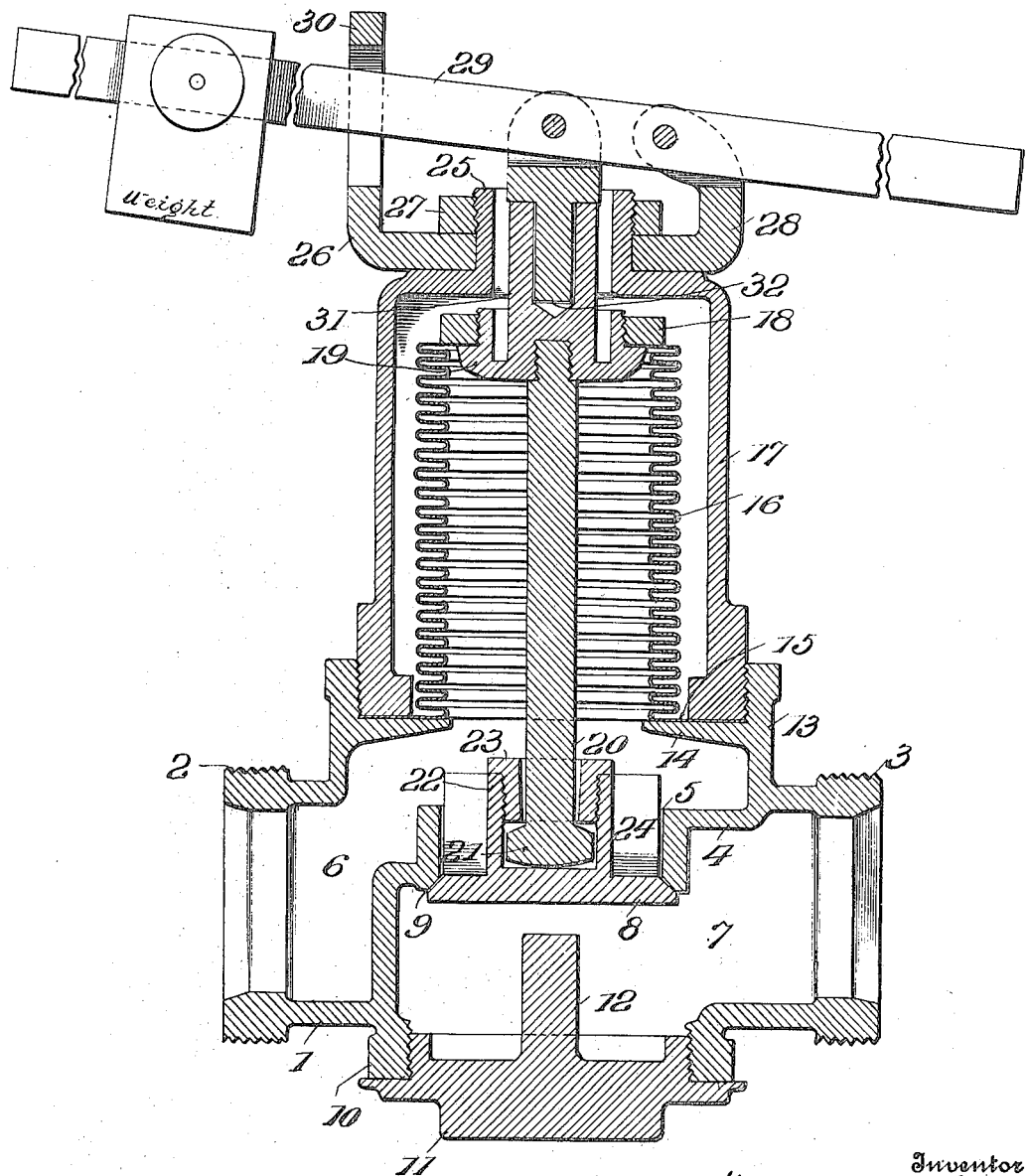

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

PRESSURE REDUCING AND REGULATING VALVE.

1,184,940.            Specification of Letters Patent.       Patented May 30, 1916.

Application filed September 14, 1914. Serial No. 861,676.

*To all whom it may concern:*

Be it known that I, WESTON M. FULTON, a citizen of the United States of America, and a resident of Knoxville, Tennessee, have invented a new and useful Improvement in Pressure Reducing and Regulating Valves, which invention is fully set forth in the following specification.

This invention relates to improvements in pressure regulating and pressure reducing valves, and more particularly to valves of this class wherein a single seated valve is employed for controlling the flow of fluids.

The invention has for its object to provide a valve device of the class referred to in which a single valve member may be balanced and may be seated and unseated quickly to thereby reduce and practically eliminate a well recognized defect known as " wire drawing ", a phenomenon apt to occur when the valve is close to seating position and to result in cutting away of the valve member and its seat and impairment of the function of the valve.

A further object is to prevent chattering of the valve while dispensing with the dash-pot which is customarily used in valves of this type for overcoming this objection.

Further objects are to reduce friction of the moving parts, to simplify the construction, and generally improve the structure and operation of the valve.

My invention secures the above objects and, generally stated, resides in providing a valve casing in which is a valve seat and a valve for the same for controlling the flow of fluid from the high pressure space in the casing to the low pressure space therein, and in providing a vibratory member consisting of a corrugated collapsible and expansible metal vessel preferably in the form of a tubular wall, the movable end wall of which is connected with the valve, the effective diameter of the vessel being equal that of the valve opening, the vibratory member being so disposed with respect to fluid pressure in the casing that such pressure will act on the vibratory member in an opposite direction to that on the valve, to balance the latter in a given position and in other positions to hasten its movement either to or away from such position. Means are also provided for applying to the valve a predetermined pressure, and these means may assume various forms, such as an adjustable weighted lever, an adjustable spring or the like.

By reason of this construction, certain peculiar and advantageous results are effected, whereby a balanced effect is secured on the valve while seated, thereby making the latter very sensitive to the action of fluid pressure on the low pressure side of the valve, while securing a rapid opening and closing action of the valve when the latter begins to unseat or approaches its seat, thus preventing chattering of the valve and "wire drawing". By way of explanation of the coöperation of the corrugated member in relation to the valve in securing these results, a theory of its operation is here offered. When a corrugated collapsible and expansible metal vessel is internally subjected to fluid pressure, this pressure obviously tends to extend or lengthen the vessel. For convenience, assume that one end of the wall is held stationary and the opposite end is movable, the pressure on the movable end does not measure the force of the fluid pressure which acts to extend the walls of the vessel. From theoretical considerations and from practical tests, it has been found that the effective surface on which this pressure acts in the case of a corrugated tubular vessel to extend the walls, is something less than the area of the end closure. In the case of a circular vessel with flexible corrugated walls, where A represents the depth of the corrugations, R the radius measured from the center of the vessel to the nearest corrugation, and X the "effective radius" which represents the radius of a circular area on which the pressure effectively acts to extend the vessel, then X may be found with a reasonable degree of accuracy by the equation—

$$X = \sqrt{R(R + .5858A) + .2929A^2}$$

From this equation can be calculated the effective diameter of any corrugated collapsible and expansible vessel for balancing pressure on a given valve. This diameter will be less than the larger diameter of the corrugated vessel and greater than the smaller diameter of the vessel.

It has further been discovered that the effective diameter of the vessel slightly increases during the extension of the corrugations from a given position, and the reverse takes place on the return to compression position. Use is made of this property of the vessel to secure important advantages in the operation of the valve, as will appear in the detailed description.

In order that the invention may be readily understood, reference is had to the drawings showing by way of example certain mechanical embodiments of the inventive idea. These drawings are intended to assist the description, but are not intended to limit the scope of the invention.

Figure 1 is a vertical sectional view showing a reducing valve provided with my improvement; Fig. 2 is a vertical sectional view of a reducing valve embodying my improvement in modified form; Fig. 3 is an end elevational view of the upper portion of the structure shown in Fig. 2; and Figs. 4 and 5 are details.

Referring to the drawings, Fig. 1 illustrates one constructional form of my invention and the preferred form, in which is shown a reducing valve casing 1 provided with the usual threaded inlet 2 and outlet 3 adapted to receive pipe connections, a partition 4 having an opening 5 communicating between the high pressure space 6 and the low pressure space 7 of the casing, a valve member 8 adapted to engage a seat 9 on the lower side of the partition, and a tapped portion 10 into which is fitted a screw-plug 11 having an upwardly projecting stud 12 adapted to act as a stop in the path of the valve member 8. On one side of the valve casing 1 and in line with the opening in the partition, the wall of the casing is provided with a circular portion 13 provided interiorly with a ledge 14 for receiving the outturned flange 15 of a flexible corrugated metal wall 16, which is preferably inclosed by a casing 17, the lower end of which is threaded to engage threads tapped into the end of portion 13 and is adapted to bear against the flange 15 to hold the latter fast against ledge 14. The upper and movable end of tubular wall 16 is closed by a plate 18 and a nut 19 adapted to engage a threaded opening in the plate 18 and to clamp between them the inturned edge of the wall 16. To this end closure is screwed a valve stem 20 adapted to be secured to valve member 8 in any suitable manner, such as by means of a head 21 formed on the end of the valve stem entering a threaded tubular portion 22 of the valve and held in place by a lock nut 23. The valve is preferably guided in its movements by wings 24 in the usual manner. The top of the housing 17 is provided with a threaded neck 25 for receiving a two-armed bracket member 26 adapted to seat on the top of the housing and fit the neck. The bracket is made fast in its position by a nut 27 fitting the neck. One arm 28 of bracket 26 is adapted to pivotally support a weighted lever 29, while the other arm 30 is adapted to serve as a guide for the lever in its various positions. The nut member 19 of the end closure of the tubular wall is provided with an upwardly extending socket 31 for receiving a plunger 32 pivotally attached to lever 29.

It is an essential feature of this construction, in order that the fluid pressure on the high pressure side of the valve may act on the tubular corrugated wall to balance the pressure on the valve in closed position, that the tubular corrugated wall be so constructed as to have an effective diameter, as defined above, equal the diameter of the valve face exposed to the pressure acting on the vibratory wall. A wall constructed to meet this condition will have its greater diameter, taken normal to the longitudinal axis of the wall, greater than that of the face of the valve and will have its smaller diameter, taken parallel thereto, smaller than that of the valve. The effective diameter will lie between the two and be determined in the manner explained.

Assuming that the valve device has been constructed as described and that fluid pressure on the high pressure side of the valve acts upward on the corrugated tubular wall to balance the downward pressure on the valve when the latter is in the closed position shown in Fig. 1, the weight on lever 29 is adjusted so as to normally open the valve when upward pressure on the low pressure side of the valve drops below a predetermined amount. As illustrated, the valve has been raised by this pressure into seated position and may be considered on the point of being opened by the action of downward pressure exerted by the weight. The longitudinal axis of the tubular wall then shortens and the effective diameter also shortens, thereby lessening the effect of the fluid pressure on the corrugated wall to oppose the downward pressure on the valve. That is, equilibrium of these opposing forces is now unbalanced in favor of the downward pressure on the valve, thereby assisting the lever-applied force to quicken the opening of the valve. This quickening action places the valve beyond the position when it can produce chattering and the injurious effects of wire-drawing. To prevent the corrugations taking a permanent set when the valve is opened, the latter is limited in its downward movement by the stop or stud 12. When the pressure in space 7 builds up to its predetermined amount, the action of this pressure on the low pressure side of the valve lifts the latter. In doing so, the effective diameter of the corrugated tubular wall increases and hastens the upward movement of the valve in a manner the reverse of that just described.

It will thus be seen that the movement of the valve is hastened when it moves away from and when it moves toward its normal position. It will be obvious that the normal position may be one in which the valve is closed or is normally open, and that the corrugated wall may be so arranged as to be on either side of the valve.

In Figs. 2 and 3, I have shown a reducing valve in all respects like that above described, except that adjustable spring pressure is utilized to move the valve from normal position and means are employed to compensate for the resiliency of the corrugated walls. On housing 17 are cast, or otherwise secured, lugs 33 having wedge-shaped recesses 34 formed in their upper extremities for receiving knife-edge bearings 35 on rocking members 36, each of which at its upper end terminates in a yoke 37, the two members of which have V-shaped bearings to receive a double knife-edge bearing 38 adapted to slip over a screw 39 located between the bearing members and adapted to receive a nut 40 attached to a spring 41 which engages a second double knife-edge member 42 resting in bearings formed in the opposite rocking member. The housing is also provided with an upright bracket 43 having a horizontal arm 44 provided with a threaded opening for receiving a screw 45, the lower end of which bears on small plate 46 carried by a spring 47 resting on an annular member 48, the lower part of which has a screw connection with the socket member 31 of the end closure of the tubular wall 16. Toggle members 49 terminating in knife-edges engage suitable bearings in the rocking members 36, 36 and in the sides of the annular member 48. These members transmit the pressure of spring 41 by means of rocking members 36 to the head of tubular wall 16. This pressure is regulated by adjusting screw 39. The position of the toggle members 49 above or below a horizontal line determines the direction of their action in compensating for the resiliency of the corrugations in the wall 16.

The valve is shown provided with a projection 50 having a slot for receiving a flat tool which may be inserted through the lower opening in the casing when the valve is ground to seat. The operation of this constructional form is the same as that previously described, except that the valve is set for maintaining a given reduced pressure by adjusting spring 47. The action of the compensating device on the operation of the reducing valve enables the latter to operate within narrower limits and with greater precision.

What is claimed is:—

1. In a valve of the character described, a valve and means for balancing the fluid pressure on one side of the valve when in one position comprising a flexible corrugated tubular wall connected to the valve and having an effective diameter equal that of the valve when in said position, and yielding means normally tending to move the valve away from said position.

2. In a valve of the character described, a valve and means for balancing the fluid pressure on one side of the valve when in one position comprising a flexible corrugated tubular wall connected to the valve and having an effective diameter equal that of the valve when in said position, and gravity-actuated means normally tending to move the valve away from said position.

3. In a valve of the character described, a valve, and means for balancing fluid pressure on one side of said valve when in one position comprising a flexible tubular corrugated wall connected to the valve, the effective diameter of the wall being equal that of the valve when the latter occupies said position.

4. In a valve of the character described, a valve member adapted to control a passage in said valve, and means subject to fluid pressure for balancing said valve in closed position and becoming active to hasten the opening and closing of said valve when the valve is moved toward either of these positions comprising a flexible corrugated tubular wall connected to said valve and having an effective diameter equal that of the valve when the latter is in closed position, said diameter decreasing as the valve opens, and yielding means normally acting to open said valve.

5. In a pressure reducing or regulating valve, a valve member adapted to control a passage in said valve, and means for balancing fluid pressure on one side of said valve when the valve is in closed position comprising a flexible corrugated tubular wall connected with said valve and having an effective diameter when the valve is in closed position equal that of the valve, and yielding means for normally acting to open said valve.

6. In a valve of the character described, a valve controlling a port, a flexible corrugated tubular metal wall operatively connected on one side of said valve and having an effective diameter equal to that of the valve in closed position for balancing fluid pressure on said side of the valve.

7. In a valve of the character described, a valve casing having a supply inlet for fluid under high pressure and an outlet for discharging fluid under low pressure, a partition between said inlet and outlet and having an opening, a valve controlling said opening located on the low pressure side of said partition, a corrugated collapsible and expansible vessel located on the high pressure side of the partition and having its movable end connected to said valve, the fluid pressure on said vessel balancing the pressure on said valve when in closed position, and yielding means acting to open said valve when the pressure on the low pressure side of the partition falls below a predetermined amount.

8. In a valve of the character described, a valve, and a collapsible and expansible corrugated metal vessel operatively connected thereto exposed to the fluid pressure on the valve and having an effective diameter equal to that of the valve when the latter is closed to balance the pressure on one side of the valve in said position of the latter.

9. In a pressure reducing or regulating valve, a valve member adapted to control a passage in said valve, means for balancing fluid pressure on one side of said valve when the valve is in closed position comprising a flexible corrugated tubular wall connected with said valve and having an effective diameter when the valve is in closed position equal that of the valve, and yielding means for normally acting to open said valve, and spring-pressed means for compensating for the resiliency of the corrugations in said wall.

10. In a reducing valve, a single valve controlling a port between high and low pressure, a flexible corrugated vessel exposed to high pressure having a connection with the high pressure side of said valve and adapted to balance said valve on the high pressure side when the valve is closed by low pressure.

11. In a valve of the character described, a valve controlling a port, a flexible corrugated tubular wall having a connection with said valve on its inlet side, said wall having an effective diameter when the valve is closed by fluid pressure on the outlet side equal to that of the port for balancing the inlet pressure on said valve.

In testimony whereof I have signed this specification in the presence of two subscribing witnesses.

WESTON M. FULTON.

Witnesses:
H. T. PATTON,
ROTHE WEIGEL.